United States Patent
Nakamura (10) Patent No.: US 10,848,378 B2
(45) Date of Patent: Nov. 24, 2020

(54) SETTING DEVICE AND COMPUTER

(71) Applicant: Yazaki Corporation, Tokyo (JP)

(72) Inventor: Yoshihide Nakamura, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 91 days.

(21) Appl. No.: 15/970,865

(22) Filed: May 3, 2018

(65) Prior Publication Data

US 2019/0007264 A1 Jan. 3, 2019

(30) Foreign Application Priority Data

Jul. 3, 2017 (JP) ................................ 2017-130080

(51) Int. Cl.
*H04L 12/24* (2006.01)
*H04L 29/08* (2006.01)

(52) U.S. Cl.
CPC ...... *H04L 41/0803* (2013.01); *H04L 41/0806* (2013.01); *H04L 41/0816* (2013.01); *H04L 41/0873* (2013.01); *H04L 67/12* (2013.01)

(58) Field of Classification Search
CPC ........... H04L 2012/40273; H04L 67/12; H04L 41/0803; H04L 41/0806; H04L 41/0809; H04L 41/085; H04L 41/0873; H04L 41/0886; H04L 41/0893; H04L 2012/40215; H04L 12/40039; H04L 12/40169; H04L 12/403; H04L 12/12; H04L 12/28; H04L 12/2818; H04L 12/2825; H04L 12/40; H04L 12/40006; H04L 12/40013; H04L 12/40032; H04L 12/40078; H04L 12/4035; H04L 12/462; H04L 12/4641; H04L 12/6418; H04L 12/66; H04L 29/12849; H04L 41/00; H04L 41/0631; H04L 41/0816; H04L 61/6027; H04L 41/0853; H04L 61/2038; H04L 61/2046; H04L 61/2061; H04L 61/2092; H04L 61/6081; H04L 61/6095; B60W 10/08; B60W 20/00; B60W 20/50; B60W 30/182; B60W 50/04; B60W 50/045;

(Continued)

(56) References Cited

U.S. PATENT DOCUMENTS 5,481,456 A * 1/1996 Ogura .................. B60R 16/0315
477/97
6,020,811 A * 2/2000 Saito .................... B60G 17/0185
340/438

(Continued)

FOREIGN PATENT DOCUMENTS

JP 2008-155906 A 7/2008
JP 2010-184575 A 8/2010

Primary Examiner — Greg C Bengzon
(74) Attorney, Agent, or Firm — Kenealy Vaidya LLP (57) ABSTRACT

A gateway causes an ECU to set an ID according to the number of loads connected to the ECU. The ECU transmits, to the gateway, a set ID which is according to the loads. If IDs transmitted from a plurality of ECUs are overlapped, the gateway causes the ECU to set an ID according to the number of parallel connections of the loads. The ECU transmits, to the gateway, a set ID which is according to the number of parallel connections. If IDs transmitted from a plurality of ECUs are overlapped, the gateway causes the ECU to set an ID according to a sum of drive currents of the loads.

5 Claims, 8 Drawing Sheets (58) Field of Classification Search
CPC ...... B60W 50/08; B60W 50/10; B60W 50/14; B60R 16/0207; B60R 16/023; B60R 16/03; B60R 16/0315; B60R 16/0231; B60R 16/0232; B60R 16/033; B60R 16/037; B60R 25/04; G06F 17/5095; G06F 21/572; G06F 11/3024; G06F 13/00; G06F 21/62; G06F 2221/2113; G06F 2221/2137; G06F 9/445; G05B 2219/2637; G05B 2219/21076; H04W 4/48; H04W 4/70

See application file for complete search history.

(56) References Cited

U.S. PATENT DOCUMENTS

| | | | | |
|---|---|---|---|---|
| 6,291,770 | B1* | 9/2001 | Casperson | B60R 16/0207 174/139 |
| 6,484,082 | B1* | 11/2002 | Millsap | H04L 12/4035 701/32.7 |
| 6,574,734 | B1* | 6/2003 | Colson | G06F 9/445 701/1 |
| 7,039,511 | B1* | 5/2006 | Kreuz | H04L 29/06 701/36 |
| 7,225,065 | B1* | 5/2007 | Hunt | B60R 16/0207 701/33.2 |
| 7,523,237 | B2* | 4/2009 | Gerig | H04L 12/4625 709/228 |
| 7,891,004 | B1* | 2/2011 | Gelvin | G06F 15/173 726/26 |
| 8,830,835 | B2* | 9/2014 | Casado | H04L 12/66 370/235 |
| 9,705,678 | B1* | 7/2017 | Wang | G06F 21/44 |
| 9,718,420 | B1* | 8/2017 | Sun | B60R 16/03 |
| 10,259,407 | B2* | 4/2019 | Iwasaki | B60R 16/03 |
| 10,374,938 | B1* | 8/2019 | Morris | H04L 45/02 |
| 10,382,327 | B1* | 8/2019 | Morris | H04L 45/02 |
| 10,389,624 | B1* | 8/2019 | Morris | H04L 45/02 |
| 10,389,625 | B1* | 8/2019 | Morris | H04L 45/02 |
| 10,394,209 | B2* | 8/2019 | Goodon | G05B 19/042 |
| 10,397,022 | B2* | 8/2019 | Kataoka | H04L 12/46 |
| 10,397,101 | B1* | 8/2019 | Morris | H04L 45/02 |
| 10,404,582 | B1* | 9/2019 | Morris | H04L 45/02 |
| 2001/0025216 | A1* | 9/2001 | Nishimura | F02D 41/266 701/48 |
| 2002/0062460 | A1* | 5/2002 | Okuda | H04L 1/24 714/25 |
| 2002/0180271 | A1* | 12/2002 | Taniguchi | B60R 16/0207 307/10.1 |
| 2004/0083234 | A1* | 4/2004 | Higuchi | G06F 8/36 |
| 2004/0088087 | A1* | 5/2004 | Fukushima | B60R 16/0231 701/29.6 |
| 2004/0124703 | A1* | 7/2004 | Tani | B60R 16/0315 307/10.1 |
| 2005/0033503 | A1* | 2/2005 | Yamamoto | B60R 25/04 701/114 |
| 2005/0152388 | A1* | 7/2005 | Ishiguro | H04L 29/12254 370/431 |
| 2005/0256614 | A1* | 11/2005 | Habermas | G06F 8/65 701/1 |
| 2006/0020372 | A1* | 1/2006 | Watabe | H04L 12/403 701/1 |
| 2006/0271694 | A1* | 11/2006 | Matsuo | H04L 49/501 709/229 |
| 2007/0030844 | A1* | 2/2007 | Fukuta | G07B 15/063 370/359 |
| 2007/0081473 | A1* | 4/2007 | Jiang | H04L 12/40169 370/254 |
| 2007/0208470 | A1* | 9/2007 | Itabashi | H04L 12/4135 701/36 |
| 2007/0250189 | A1* | 10/2007 | Rourke | G06Q 10/10 700/90 |
| 2007/0250190 | A1* | 10/2007 | Rourke | G06Q 10/10 700/90 |
| 2008/0027588 | A1* | 1/2008 | Fukui | G06F 9/546 701/1 |
| 2008/0177919 | A1* | 7/2008 | Miyazawa | H04L 12/403 710/110 |
| 2008/0216067 | A1* | 9/2008 | Villing | G06F 8/60 717/174 |
| 2008/0244757 | A1* | 10/2008 | Nakagaki | B60R 25/00 726/28 |
| 2009/0070488 | A1* | 3/2009 | Bruenner | H04L 67/12 709/245 |
| 2009/0138136 | A1* | 5/2009 | Natsume | B60R 16/0315 701/1 |
| 2009/0271051 | A1* | 10/2009 | Teramura | B60R 25/04 701/1 |
| 2010/0022347 | A1* | 1/2010 | Irie | B60K 6/445 477/3 |
| 2010/0023198 | A1* | 1/2010 | Hamilton | B60R 16/03 701/31.4 |
| 2010/0030525 | A1* | 2/2010 | Dong | G06F 17/5095 703/1 |
| 2010/0030546 | A1* | 2/2010 | Dong | B60R 16/0207 703/14 |
| 2010/0031212 | A1* | 2/2010 | Dong | G06F 17/50 716/100 |
| 2010/0042290 | A1* | 2/2010 | Isoyama | H04L 12/40006 701/33.4 |
| 2010/0098095 | A1* | 4/2010 | Kato | H04L 12/4625 370/401 |
| 2010/0215043 | A1* | 8/2010 | Hisada | H04L 12/40 370/392 |
| 2011/0046844 | A1* | 2/2011 | Honner | H04L 12/12 701/31.4 |
| 2011/0082611 | A1* | 4/2011 | Shiba | B60K 6/445 701/22 |
| 2011/0119556 | A1* | 5/2011 | de Buen | H04L 41/12 714/758 |
| 2011/0128855 | A1* | 6/2011 | Ando | H04J 3/0652 370/236 |
| 2011/0153149 | A1* | 6/2011 | Jeon | H04L 29/12849 701/29.6 |
| 2011/0194458 | A1* | 8/2011 | Nieuwland | H04L 12/40169 370/254 |
| 2011/0222433 | A1* | 9/2011 | Jones | H04L 61/2092 370/254 |
| 2012/0020401 | A1* | 1/2012 | Itou | H04L 12/40019 375/224 |
| 2012/0217798 | A1* | 8/2012 | DeHart | B60L 1/003 307/10.1 |
| 2012/0265359 | A1* | 10/2012 | Das | G06F 15/025 700/292 |
| 2012/0278507 | A1* | 11/2012 | Menon | H04J 3/0655 709/248 |
| 2012/0307836 | A1* | 12/2012 | Ishigooka | H04L 12/40006 370/401 |
| 2012/0327978 | A1* | 12/2012 | Nishimura | H04L 12/40032 375/211 |
| 2013/0022054 | A1* | 1/2013 | Goodermuth | B61L 15/0081 370/431 |
| 2013/0159466 | A1* | 6/2013 | Mao | H04L 67/12 709/218 |
| 2013/0166778 | A1* | 6/2013 | Ishigooka | H04L 12/4035 709/248 |
| 2013/0179033 | A1* | 7/2013 | Williams | B60R 16/03 701/36 |
| 2013/0311526 | A1* | 11/2013 | Uesaka | H04L 67/16 707/825 |
| 2013/0322449 | A1* | 12/2013 | Hwang | H04L 45/50 370/392 |
| 2014/0025268 | A1* | 1/2014 | Yaguchi | B60K 6/445 701/51 |
| 2014/0040992 | A1* | 2/2014 | Koide | H04L 9/3242 726/4 |
| 2014/0047146 | A1* | 2/2014 | Nakagawa | G06F 13/42 710/105 |
| 2014/0095749 | A1* | 4/2014 | Lambrechts | G06F 13/4063 710/104 |

(56) References Cited

U.S. PATENT DOCUMENTS

| | | | |
|---|---|---|---|
| 2014/0103715 A1* | 4/2014 | Ito | B60R 16/0207 307/24 |
| 2014/0107878 A1* | 4/2014 | Takahashi | G01M 15/11 701/22 |
| 2014/0114497 A1* | 4/2014 | Miyake | H04L 9/3271 701/1 |
| 2014/0241370 A1* | 8/2014 | Itou | H04L 45/44 370/396 |
| 2014/0245046 A1* | 8/2014 | Itou | H04L 12/40039 713/323 |
| 2014/0288756 A1* | 9/2014 | Tanaka | B60K 6/34 701/22 |
| 2014/0343787 A1* | 11/2014 | Mabuchi | B60W 50/04 701/31.7 |
| 2014/0344499 A1* | 11/2014 | Uemura | G06F 13/4086 710/313 |
| 2014/0350787 A1* | 11/2014 | Swanson | B60G 17/0195 701/38 |
| 2015/0089236 A1* | 3/2015 | Han | H04L 9/3242 713/181 |
| 2015/0109962 A1* | 4/2015 | Liao | H04L 45/04 370/254 |
| 2015/0117223 A1* | 4/2015 | Lih | H04L 12/437 370/238 |
| 2015/0124597 A1* | 5/2015 | Mabuchi | H04L 12/413 370/230 |
| 2015/0149682 A1* | 5/2015 | Uemura | G06F 13/28 710/308 |
| 2015/0158413 A1* | 6/2015 | Tatara | B60Q 1/1423 315/77 |
| 2015/0200712 A1* | 7/2015 | Cooper | B60T 17/228 375/257 |
| 2015/0217790 A1* | 8/2015 | Golden | H04W 4/46 701/19 |
| 2015/0281022 A1* | 10/2015 | Harata | H04L 12/2825 370/242 |
| 2015/0291148 A1* | 10/2015 | Sakai | B60K 6/445 701/22 |
| 2015/0298626 A1* | 10/2015 | Okuyama | B60W 50/045 701/1 |
| 2015/0301822 A1* | 10/2015 | Takahashi | G06F 13/00 717/173 |
| 2015/0326529 A1* | 11/2015 | Morita | H04L 63/02 726/12 |
| 2015/0348339 A1* | 12/2015 | Ohno | G07C 5/0808 701/32.7 |
| 2015/0358351 A1* | 12/2015 | Otsuka | H04L 12/4625 726/23 |
| 2016/0021178 A1* | 1/2016 | Liu | H04L 41/06 370/216 |
| 2016/0031389 A1* | 2/2016 | Grimm | B60R 16/023 701/33.1 |
| 2016/0129810 A1* | 5/2016 | Takahashi | B60L 15/2036 701/22 |
| 2016/0159297 A1* | 6/2016 | Aoki | B60R 16/033 307/10.1 |
| 2016/0159299 A1* | 6/2016 | Aoki | B60R 16/03 307/10.1 |
| 2016/0163125 A1* | 6/2016 | Kim | G07C 5/008 701/31.4 |
| 2016/0173505 A1* | 6/2016 | Ichihara | H04W 12/1006 713/170 |
| 2016/0173530 A1* | 6/2016 | Miyake | H04L 63/08 726/3 |
| 2016/0197783 A1* | 7/2016 | Hort | H04L 41/0809 709/222 |
| 2016/0224806 A1* | 8/2016 | Takada | G06F 21/64 |
| 2016/0234037 A1* | 8/2016 | Mabuchi | H04L 67/12 |
| 2016/0288739 A1* | 10/2016 | Takahashi | B60L 50/50 |
| 2016/0305797 A1* | 10/2016 | Pietrasik | H04W 4/80 |
| 2016/0308822 A1* | 10/2016 | Chae | H04L 61/2007 |
| 2016/0344601 A1* | 11/2016 | Kaku | H04L 1/00 |
| 2016/0347269 A1* | 12/2016 | Breed | B60R 16/0207 |
| 2016/0359545 A1* | 12/2016 | Kodama | H04L 12/407 |
| 2016/0359741 A1* | 12/2016 | Cooper | B61L 15/0072 |
| 2017/0013005 A1* | 1/2017 | Galula | H04L 63/123 |
| 2017/0026373 A1* | 1/2017 | Yajima | H04L 63/0884 |
| 2017/0026386 A1* | 1/2017 | Unagami | G06F 21/71 |
| 2017/0028979 A1* | 2/2017 | Miyashita | B60L 58/25 |
| 2017/0092018 A1* | 3/2017 | Throop | G07C 5/0816 |
| 2017/0093866 A1* | 3/2017 | Ben-Noon | H04L 9/3234 |
| 2017/0093908 A1* | 3/2017 | Elend | H04L 1/0045 |
| 2017/0106820 A1* | 4/2017 | Maruyama | B60R 16/03 |
| 2017/0134164 A1* | 5/2017 | Haga | B60R 16/023 |
| 2017/0134537 A1* | 5/2017 | O'Mahony | G07C 5/008 |
| 2017/0192770 A1* | 7/2017 | Ujiie | G06F 11/1433 |
| 2017/0240049 A1* | 8/2017 | Ebert | B60R 16/03 |
| 2017/0262301 A1* | 9/2017 | Bai | G06F 9/4411 |
| 2017/0293277 A1* | 10/2017 | Goodon | H04L 12/4135 |
| 2017/0324579 A1* | 11/2017 | Takada | H04L 12/40163 |
| 2017/0324675 A1* | 11/2017 | Takada | H04L 47/34 |
| 2017/0324817 A1* | 11/2017 | Oliveira | H04L 67/10 |
| 2017/0339095 A1* | 11/2017 | Lei | H04L 41/12 |
| 2018/0018160 A1* | 1/2018 | Teraoka | B60R 16/02 |
| 2018/0152341 A1* | 5/2018 | Maeda | G06F 11/10 |
| 2018/0222409 A1* | 8/2018 | Binder | B60L 1/00 |
| 2018/0227147 A1* | 8/2018 | Kataoka | H04L 12/46 |
| 2018/0241584 A1* | 8/2018 | Ruvio | H04L 12/40013 |
| 2018/0302265 A1* | 10/2018 | Atobe | H04L 29/06 |
| 2018/0302422 A1* | 10/2018 | Kishikawa | H04L 12/28 |
| 2018/0367546 A1* | 12/2018 | Miyashita | H04L 12/28 |
| 2019/0007215 A1* | 1/2019 | Hakuta | G06F 21/44 |
| 2019/0007264 A1* | 1/2019 | Nakamura | H04L 67/12 |
| 2019/0026962 A1* | 1/2019 | Gintz | G07C 5/085 |
| 2019/0052481 A1* | 2/2019 | Wu | H04L 12/4641 |
| 2019/0058611 A1* | 2/2019 | Maeda | H04L 12/40 |
| 2019/0068407 A1* | 2/2019 | Haga | H04L 12/66 |

* cited by examiner

SETTING DEVICE AND COMPUTER

BACKGROUND

Technical Field

The present disclosure relates to a setting device and a computer.

Related Art

In recent years, cars are becoming more functional and diverse, and for example, cars in which motorized movement mechanisms based on motors are installed for doors and seats are being developed. Moreover, there is proposed a technique for controlling a load by using multiplex communication so as to control a motor load as a drive source for such a motorized mechanism.

Furthermore, according to the technique described above, to perform load control by using multiplex communication, a computer to be connected to a load is provided with a communication function, a control function, and an ID identification function.

As a method for setting an ID in the computer mentioned above, it is proposed to set an ID according to operation information of a load which is connected to an in-vehicle connector (computer) (JP 2008-155906 A). The operation information is a lock current of a motor, for example.

However, according to the conventional ID setting method described above, information, such as a lock current of a motor, which is unique to a load which is connected to an in-vehicle connector is set as the operation information. Accordingly, for example, if information such as the number of loads connected to the in-vehicle connector is set as the operation information, IDs are possibly overlapped.

CITATION LIST

Patent Literature

Patent Literature 1: JP 2008-155906 A

SUMMARY

Technical Problem

The present disclosure has been made in view of the above circumstances, and has it object to provide a setting device which is capable of preventing overlapping of identification information of computers, and a computer in which identification information is set by the setting device.

Solution to Problem

A setting device being a first aspect of the present disclosure is a setting device for causing a plurality of computers connected to a load to set identification information, the setting device including: a first setting unit configured to cause each of the computers to set identification information according to first information related to the load; and a second setting unit configured to cause the plurality of computers to set identification information according to second information about the load different from the first information, in a case where pieces of identification information of the plurality of computers set by the first setting unit are overlapped.

Furthermore, a third setting unit configured to cause the computers to set identification information according to third information about the load different from the first information and the second information, in a case where pieces of identification information of the plurality of computers set by the second setting unit are overlapped, may be included.

Furthermore, each of the first information and the second information may be one of the number of loads connected to the computer, the number of parallel connections of loads connected to the computer, and a sum of drive currents flowing through loads connected to the computer.

Furthermore, the third information may be one of the number of loads connected to the computer, the number of parallel connections of loads connected to the computer, and a sum of drive currents flowing through loads connected to the computer.

A computer being a second aspect of the present disclosure is a computer for setting identification information of the computer in response to a request from a setting device, the computer including: a fourth setting unit configured to detect first information about a load connected to the computer, in response to a setting request from the setting device for identification information according to the first information, and to set the identification information of the computer; a fifth setting unit configured to detect second information about the load different from the first information, in response to a setting request from the setting device for identification information according to the second information, and to set the identification information of the computer; and a transmission unit configured to transmit, to the setting device, the identification information of the computer set by the fourth setting unit and the fifth setting unit.

Advantageous Effects of Invention

According to the present disclosure described above, overlapping of identification information of computers may be prevented.

DETAILED DESCRIPTION

Figure 1:
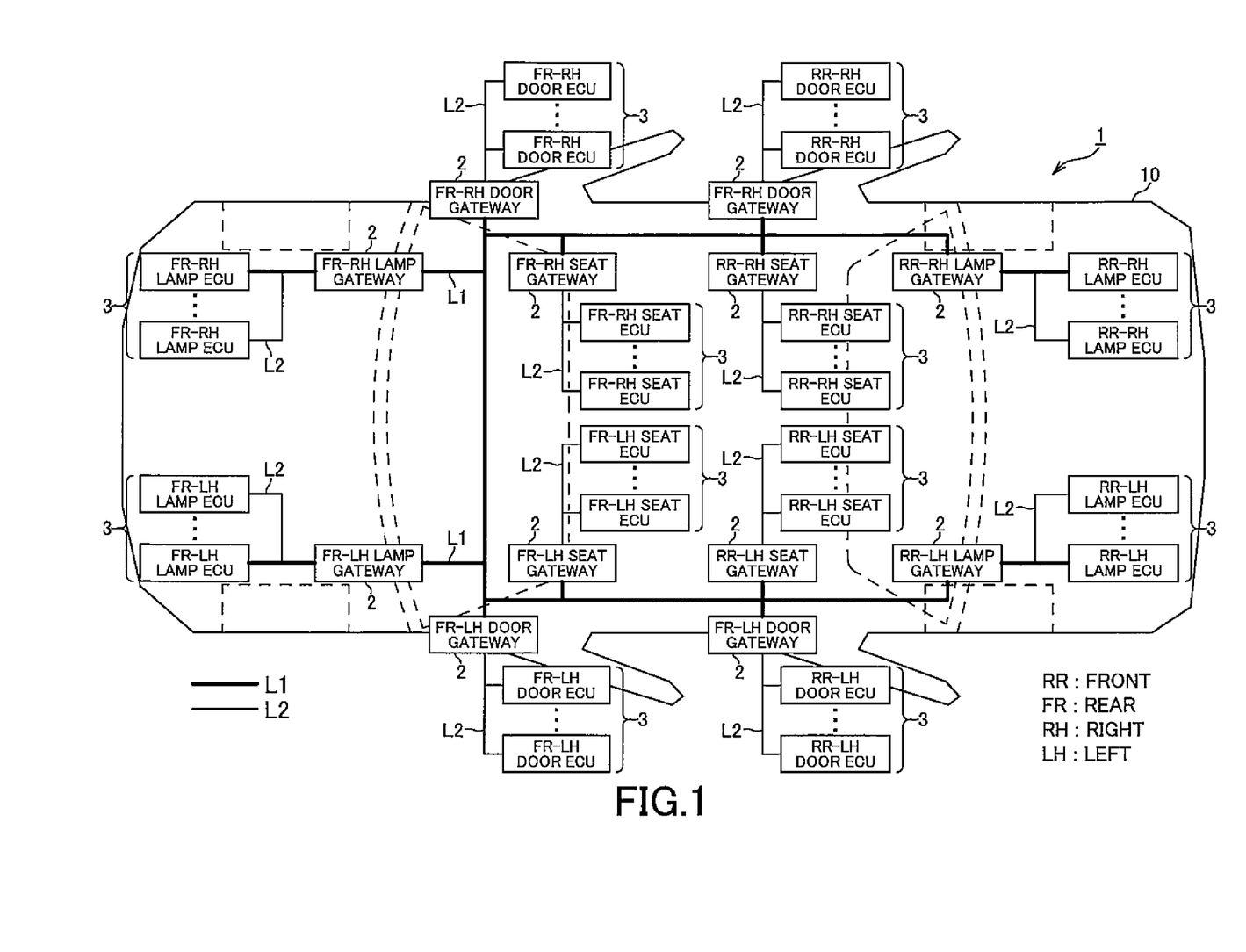
FIG. 1 is a block diagram showing an in-vehicle network where gateways and ECUs are embedded as setting devices and computers, respectively, of the present disclosure.
Figure 2:
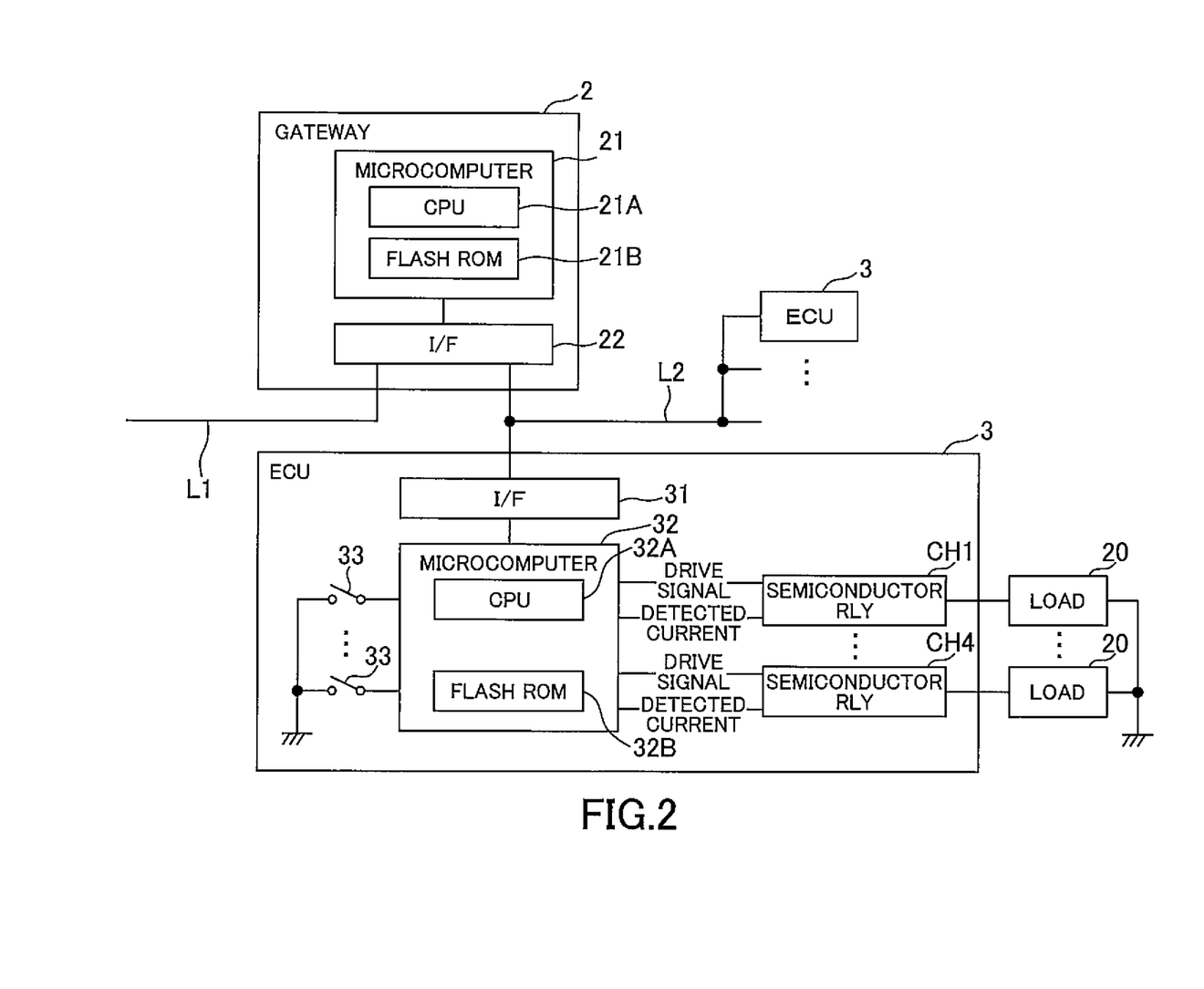
FIG. 2 is a block diagram showing configurations of the gateway and the ECU shown in FIG. 1.

Hereinafter, an embodiment of the present disclosure will be described with reference to FIGS. 1 and 2. FIG. 1 is a block diagram showing an in-vehicle network where gateways and ECUs are embedded as setting devices and computers, respectively, of the present disclosure. FIG. 2 is a block diagram showing configurations of the gateway and the ECU shown in FIG. 1.

An in-vehicle network 1 shown in FIG. 1 is installed in a vehicle 10. The in-vehicle network 1 includes a plurality of gateways 2 as setting devices having a master function, and a plurality of ECUs 3 as computers having a slave function. The plurality of gateways 2 are disposed in respective areas of the vehicle 10, and are communicably connected with one another by a communication line L1. The gateway 2 is communicably connected by a communication line L2 to a plurality of ECUs 3 disposed in the area of the gateway 2 in question.

The gateway 2 controls operations of a plurality of ECUs 3 by communicating with the plurality of ECUs 3. As shown in FIG. 2, a plurality of loads 20, such as a valve, a motor, and a lamp, are connected to the ECU 3, and driving of the loads 20 is controlled by communication with the gateway 2.

Next, a configuration of the gateway 2 described above will be described. As shown in FIG. 2, the gateways 2 each include an interface (hereinafter "I/F") 21, and a microcomputer 22. The I/F 21 is a communication interface for performing communication with other gateways 2, and other ECUs 3 connected by the communication line L2. The I/F 21 is an interface allowing input/output of signals according to various communication schemes (such as CAN, LIN, and other communication schemes).

The microcomputer 22 is configured from a known central processing unit (CPU) 22A, and a flash read only memory (ROM) 22B. The CPU 22A controls the entire gateway 2, and performs various types of processing according to processing programs. The flash ROM 22B is a memory for storing identification information (hereinafter "ID") of the belonging gateway 2, an ID of the ECU 3 connected to the gateway 2, programs for the processing to be performed by the CPU 22A, and the like.

Next, a configuration of the ECU 3 described above will be described. The plurality of the ECUs 3 have the same configuration, and the ECUs 3 each include an I/F 31, a microcomputer 32, a plurality of local SWs 33, and a plurality of semiconductor relays CH1-CH4. The I/F 31 is a communication interface for performing communication with the gateway 2, and allows input/output of signals according to various communication schemes (such as CAN, LIN, and other communication schemes).

The microcomputer 32 is configured from a CPU 32A, and a flash ROM 32B. The CPU 32A controls the entire ECU 3, and performs various types of processing according to processing programs. The flash ROM 32B is a memory for storing an initial ID, programs for the processing to be performed by the CPU 32A, variables, and set values, and in an initial state, the same contents are written in all the ECUs 3. The initial ID is a provisional ID before assignment of a dedicated ID, and an initial ID for transmission and an initial ID for reception are set.

For example, in the present embodiment, "01010101" is stored as the initial ID for transmission, and "10101010" is stored as the initial ID for reception. Moreover, the programs for the processing to be performed by the CPU 32A include a communicate program for communicating with another ECU 3 connected by the communication line L2, and system programs necessary for system operation.

The plurality of local SWs 33 are connected to the microcomputer 32, and are configured to input on/off information to the microcomputer 32. The plurality of semiconductor relays CH1-CH4 are each connected between the microcomputer 32 and a load 20, and are each switched on/off according to a drive signal from the microcomputer 32. Furthermore, the semiconductor relay CH1-CH4 has a current detection function for detecting a current flowing through itself, and inputs the detected current to the microcomputer 32. In the present embodiment, the number of semiconductor relays CH1-CH4 provided in the ECU 3 is described to be four, but this is not restrictive, and any number of semiconductor relays may be provided. All the ECUs 3 include the same number of semiconductor relays CH1-CH4.

Each ECU 3 described above has a function for setting an ID by rewriting an initial ID to a dedicated ID by performing ID setting processing with the gateway 2. After the dedicated ID is set, the ECU 3 receives load control program data, which is transmitted from an external rewriting device by using the dedicated ID, and the ECU 3 is enabled to perform a load operation by writing the load control program data in the corresponding flash ROM 32B.

Next, a description will be given of the dedicated ID mentioned above. As shown in Table 1 below, the dedicated ID is constructed from 6-bit network information, and 2-bit ECU number. In the present embodiment, the ECU number is composed of 2 bits, and thus, maximum four (=2×2) ECUs 3 can be connected to the gateway 2, and dedicated IDs may be assigned to the ECUs 3. In the present embodiment, a case where the ECU number is composed of 2 bits is described, but the number of ECUs that can be set may be increased by increasing the bit length.

TABLE 1

| ECU Dedicated ID | | | | | | |
|---|---|---|---|---|---|---|
| Network Information | | | | | | |
| System | | Area | | Unit Type | Communication Direction | ECU No. |
| bit7 | bit6 | bit5 | bit4 | bit3 | bit2 | bit1   bit0 |
| Lamp System Load: 01 Door System Load: 10 Seat System Load: 11 | | Front Side: 0 Rear Side: 1 | Right Side: 0 Left Side: 1 | ECU: 1 | Reception: 0 Transmission: 1 | No1: 00 No2: 01 No3: 10 No4: 11 |

As shown in Table 1, the network information is composed of information indicating a system, information indicating an area, information indicating a unit type, and information indicating a communication direction. The information indicating a system (2-bit) is information indicating the type of the load 20 connected to the ECU 3. In the present embodiment, loads 20 to be connected to the ECU 3 are categorized into three types of a lamp system load, a door system load, and a seat system load. The information indicating an area (2-bit) is information indicating the area where the ECU 3 is disposed. In the present embodiment, areas are categorized into four areas of front, rear, left, and right of the vehicle. The information indicating a unit type is information indicating the type of a unit to which an ID is assigned. In the present embodiment, the ECU 3 is the only unit to which an ID is assigned. The ECU number is a number which is allocated to each ECU 3 connected to the gateway 2 within the area of the gateway 2 in question in a non-overlapping manner.

For example, a dedicated ID for transmission and a dedicated ID for reception as shown in Tables 2 and 3 below are allocated to the ECU 3 to which the lamp system load 20 is connected and which is disposed in a front right area.

TABLE 2

| ECU Dedicated ID (Transmission) | | | | |
|---|---|---|---|---|
| Network Information | | | | |
| System | Area | Unit Type | Communication Direction | ECU No. |
| bit7 bit6 | bit5 bit4 | bit3 | bit2 | bit1 bit0 |
| 0 1 | 0 0 | 1 | 1 | No1: 00 No2: 01 No3: 10 No4: 11 |

| ECU Dedicated ID (Reception) | | | | |
|---|---|---|---|---|
| Network Information | | | | |
| System | Area | Unit Type | Communication Direction | ECU No. |
| bit7 bit6 | bit5 bit4 | bit3 | bit2 | bit1 bit0 |
| 0 1 | 0 0 | 1 | 0 | No1: 00 No2: 01 No3: 10 No4: 11 |

Next, an operation of the in-vehicle network 1 configured in the above manner will be described with reference to the flowcharts in FIGS. 3 and 4. First, after being activated, the microcomputer 32 of the ECU 3 (hereinafter simply "ECU") checks an ID setting area in the flash ROM 32B, and if the IDs are not initial IDs (initial ID for transmission: 01010101, initial ID for reception: 10101010) (step S1: N), performs normal processing (step S2), and ends the processing.

On the other hand, if the IDs are initial IDs (step S1: Y), the ECU 3 transmits, to the gateway 2, an ID setting signal requesting for setting of an ID with the initial ID for transmission attached thereto (step S3). As shown in Table 4 below, the ID setting signal is an 8-bit signal where bit7 is "1" and bit6-bit0 are blank, and an initial ID is attached thereto.

TABLE 4

| Initial ID | | | | | | | | ID Setting Signal | | | | | | | |
|---|---|---|---|---|---|---|---|---|---|---|---|---|---|---|---|
| bit 7 | bit 6 | bit 5 | bit 4 | bit 3 | bit 2 | bit 1 | bit 0 | bit 7 | bit 6 | bit 5 | bit 4 | bit 3 | bit 2 | bit 1 | bit 0 |
| 0 | 1 | 0 | 1 | 0 | 1 | 0 | 1 | ID Setting Complete Requested: 1 Non-Requested: 0 | — | — | — | — | — | — | — |

After activation, if the ID setting signal from the ECU 3 is not received within a predetermined period of time T1 (step S20: N), the microcomputer 22 of the gateway 2 (hereinafter simply "gateway 2") performs normal processing (step S21), and ends the processing.

On the other hand, after activation, if the ID setting signal from the ECU 3 is received within the predetermined period of time T1 (step S20: Y), the gateway 2 functions as a first setting unit, and broadcasts a first request signal requesting for setting of an ID according to the number of loads 20 (first information) connected to the ECU 3 (step S22). If the first request signal is not received within a predetermined period of time T2 after transmission of the ID setting signal (step S4: N), the ECU 3 stops the processing (step S5), and ends the processing.

If the first request signal is received within the predetermined period of time T2 after transmission of the ID setting signal (step S4: Y), the ECU 3 acts as a fourth setting unit, and performs first setting processing for setting an ID according to the number of loads 20 (first information) connected to the ECU 3 (step S6).

Figure 5:
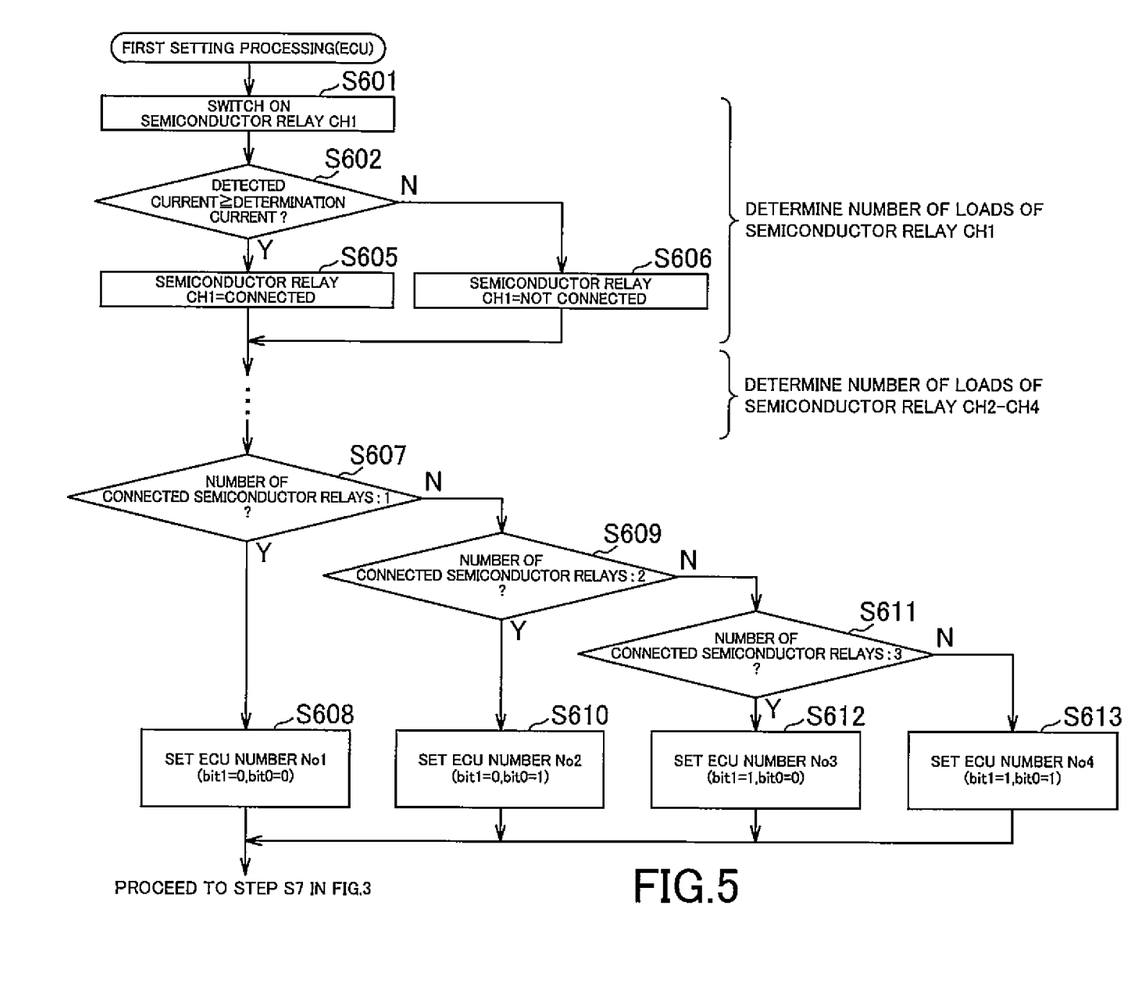
FIG. 5 is a flowchart showing first setting processing by the ECU shown in FIG. 1.

The first setting processing will be described below with reference to the flowchart in FIG. 5. In the first setting processing, the ECU 3 switches on the semiconductor relay CH1 (step S601). Then, the ECU 3 determines whether or not a detected current detected by the semiconductor relay CH1 is at or above a determination current (step S602). If the detected current of the semiconductor relay CH1 is at or above a predetermined threshold (step S602: Y), the ECU 3 determines that a load 20 is connected to the semiconductor relay CH1 (downstream connection present) (step S605). On the other hand, if the detected current of the semiconductor relay CH1 is below the determination current (step S602: N), the ECU 3 determines that a load 20 is not connected to the semiconductor relay CH1 (downstream connection absent) (step S606).

The ECU 3 sequentially switches on the semiconductor relays CH2-CH4 in a similar manner, and determines whether or not a load 20 is connected to the semiconductor relay CH2-CH4. After determining whether or not a load 20 is connected to each of the semiconductor relays CH2-CH4 provided in the ECU 3, the ECU 3 proceeds to step S607.

In step S607, if the number of semiconductor relays CH1-CH4 to which a load 20 is connected is one (step S607: Y), the ECU 3 sets the ECU number to No1 (bit1=0, bit2=0) (step S608), and then proceeds to step S7 in FIG. 3. Furthermore, if the number of semiconductor relays CH1-CH4 to which a load 20 is connected is two (step S609: Y), the ECU 3 sets the ECU number to No2 (bit1=0, bit2=1) (step S610), and then proceeds to step S7 in FIG. 3.

Furthermore, if the number of semiconductor relays CH1-CH4 to which a load 20 is connected is three (step S611: Y), the ECU 3 sets the ECU number to No3 (bit1=1, bit2=0) (step S612), and then proceeds to step S7 in FIG. 3. Moreover, if the number of semiconductor relays CH1-CH4 to which a load 20 is connected is four (step S611: N), the ECU 3 sets the ECU number to No4 (bit1=1, bit2=1) (step S613), and then proceeds to step S7 in FIG. 3.

Figure 3:
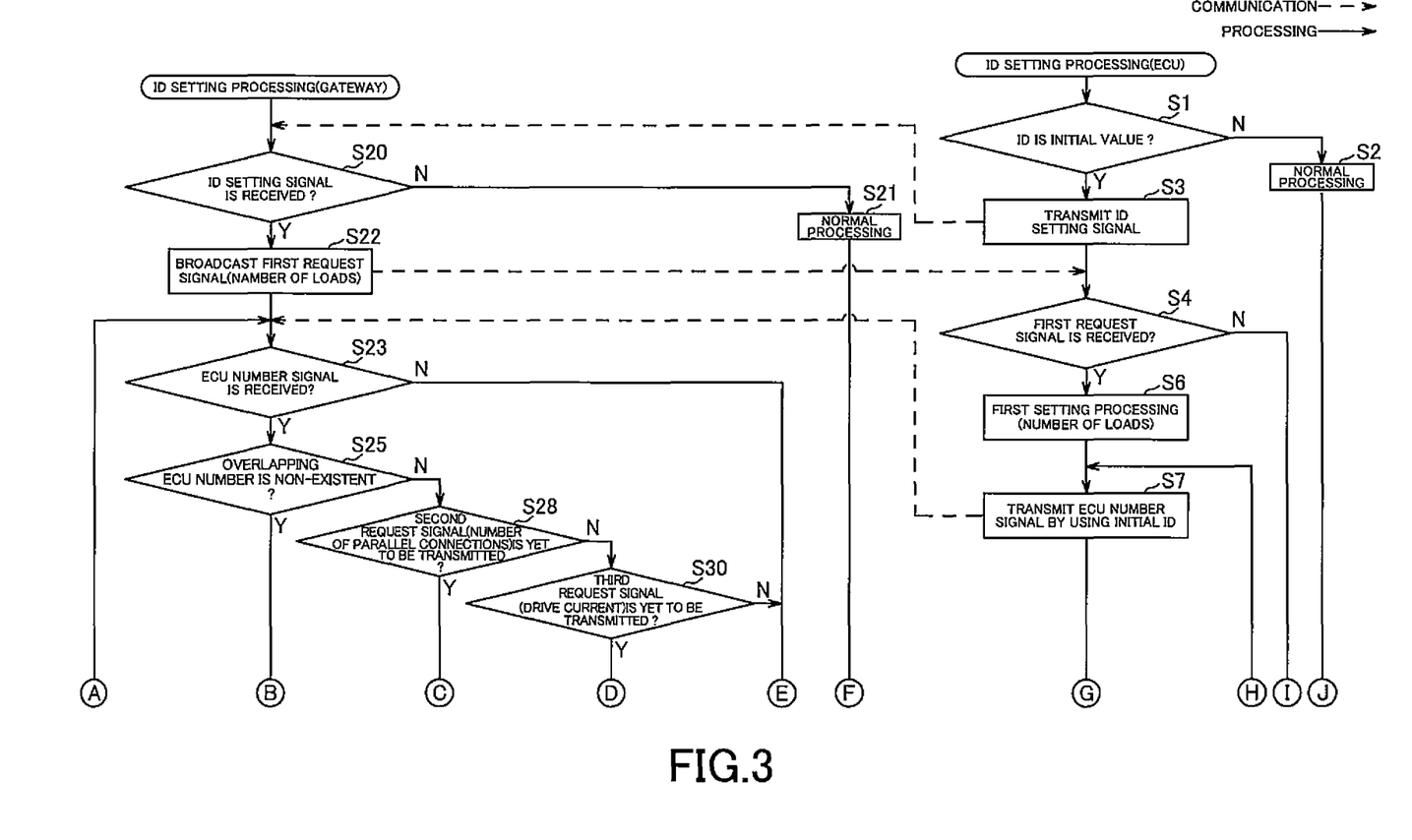
FIG. 3 is a flowchart showing ID setting processing by the gateway and the ECU shown in FIG. 1.
Figure 4:
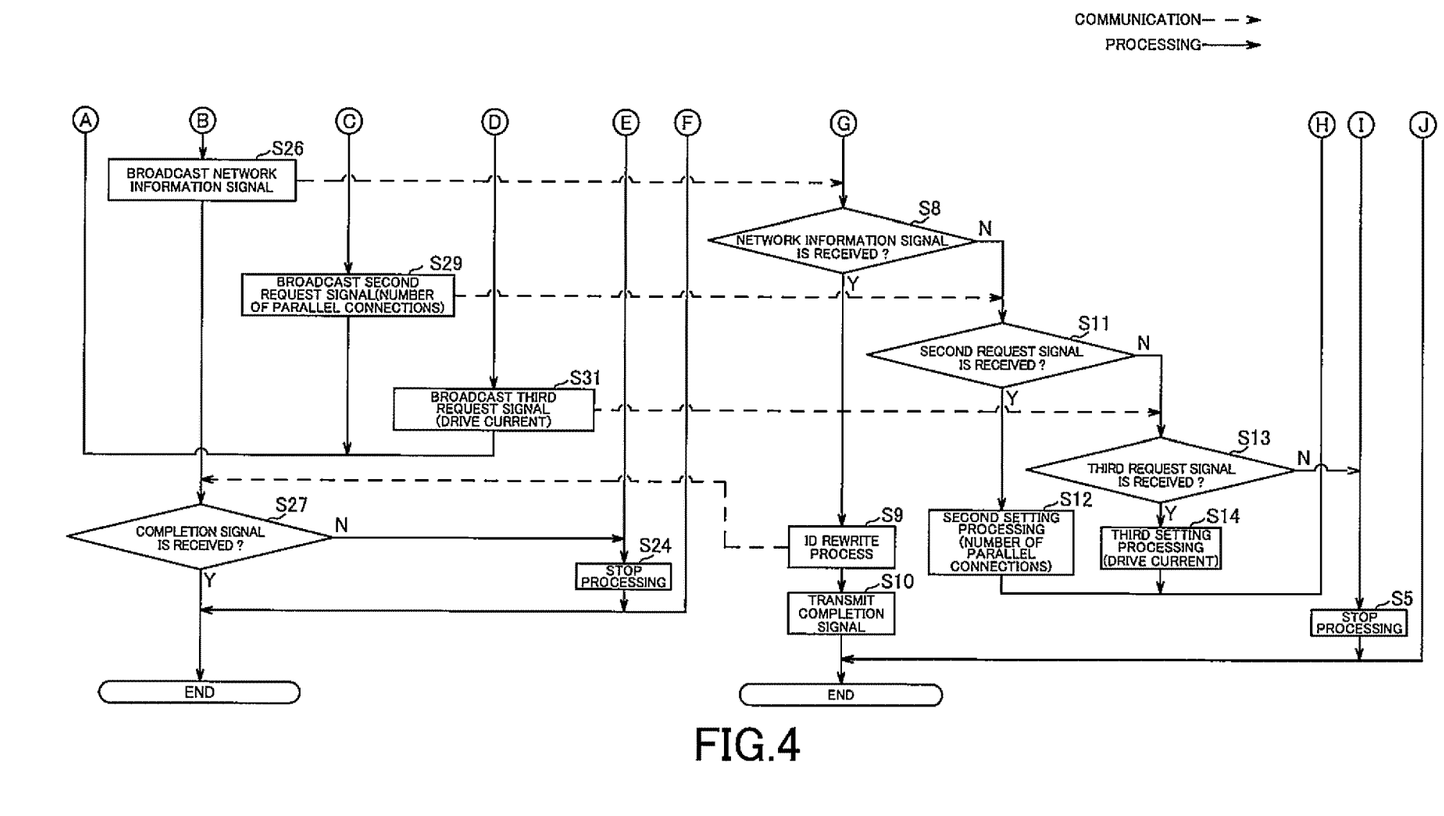
FIG. 4 is a flowchart showing following processes of the ID setting processing shown in FIG. 3.

Next, in step S7 in FIG. 3, the ECU 3 acts as a transmission unit, and attaches the initial ID to an ECU number signal and transmits the same to the gateway 2. As shown in Table 5 below, the ECU number signal is a signal where bit7-bit2 are blank, and the ECU number is written in bit1, bit0.

TABLE 5

| Initial ID | | | | | | | | ECU Number Signal | | | | | | | |
|---|---|---|---|---|---|---|---|---|---|---|---|---|---|---|---|
| bit7 | bit6 | bit5 | bit4 | bit3 | bit2 | bit1 | bit0 | bit7 | bit6 | bit5 | bit4 | bit3 | bit2 | bit1 | bit0 |
| 0 | 1 | 0 | 1 | 0 | 1 | 0 | 1 | — | — | — | — | — | — | — | ECU No. No1: 00 No2: 01 No3: 10 No4: 11 |

If the ECU number signal is not received from all the ECUs 3 connected by the communication line L2 within a predetermined period of time T3 from transmission of the first request signal (step S23: N), the gateway 2 stops the processing (step S24), and ends the processing.

When the ECU number signal is received from all the ECUs 3 connected by the communication line L2 within the predetermined period of time T3 from transmission of the first request signal (step S23: Y), the gateway 2 determines whether or not an overlapping ECU number is non-existent (step S25). If an overlapping ECU number is non-existent (step S25: Y), the gateway 2 broadcasts a network information signal (step S26).

If the network information signal is received from the gateway 2 within a predetermined period of time T4 after transmitting the ECU number signal (step S8: Y), the ECU 3 performs an ID rewrite process (step S9). In the ID rewrite process, the ECU 3 rewrites the initial ID to a dedicated ID including the ECU number set by itself and the received network information. Then, the ECU 3 transmits, to the gateway 2, a completion signal indicating that setting of an ID using the dedicated ID is completed (step S10), and ends the processing. As shown in Table 6 below, the completion signal is a signal where bit7 is 1 and bit6-bit0 are blank, to which the dedicated ID is attached.

information signal (step S27: N), the gateway 2 stops the processing (step S24), and ends the processing. On the other hand, if the completion signal is received (step S27: Y), the gateway 2 immediately ends the processing.

If the number of connected loads 20 overlaps between a plurality of ECUs 3 connected to the gateway 2, this results in an overlapping ECU number. In the case where there is an overlapping ECU number (step S25: N), if a second request signal is yet to be transmitted (step S28: Y), the gateway 2 acts as a second setting unit, and broadcasts the second request signal (step S29). The second request signal is a signal requesting for setting of an ID according to the number of parallel connections of loads 20 (second information) connected to the ECU 3. If the second request signal is received within a predetermined period of time T4 from transmission of the ECU number signal (step S11: Y), the ECU 3 acts as a fifth setting unit, and performs second setting processing (step S12).

Figure 6:
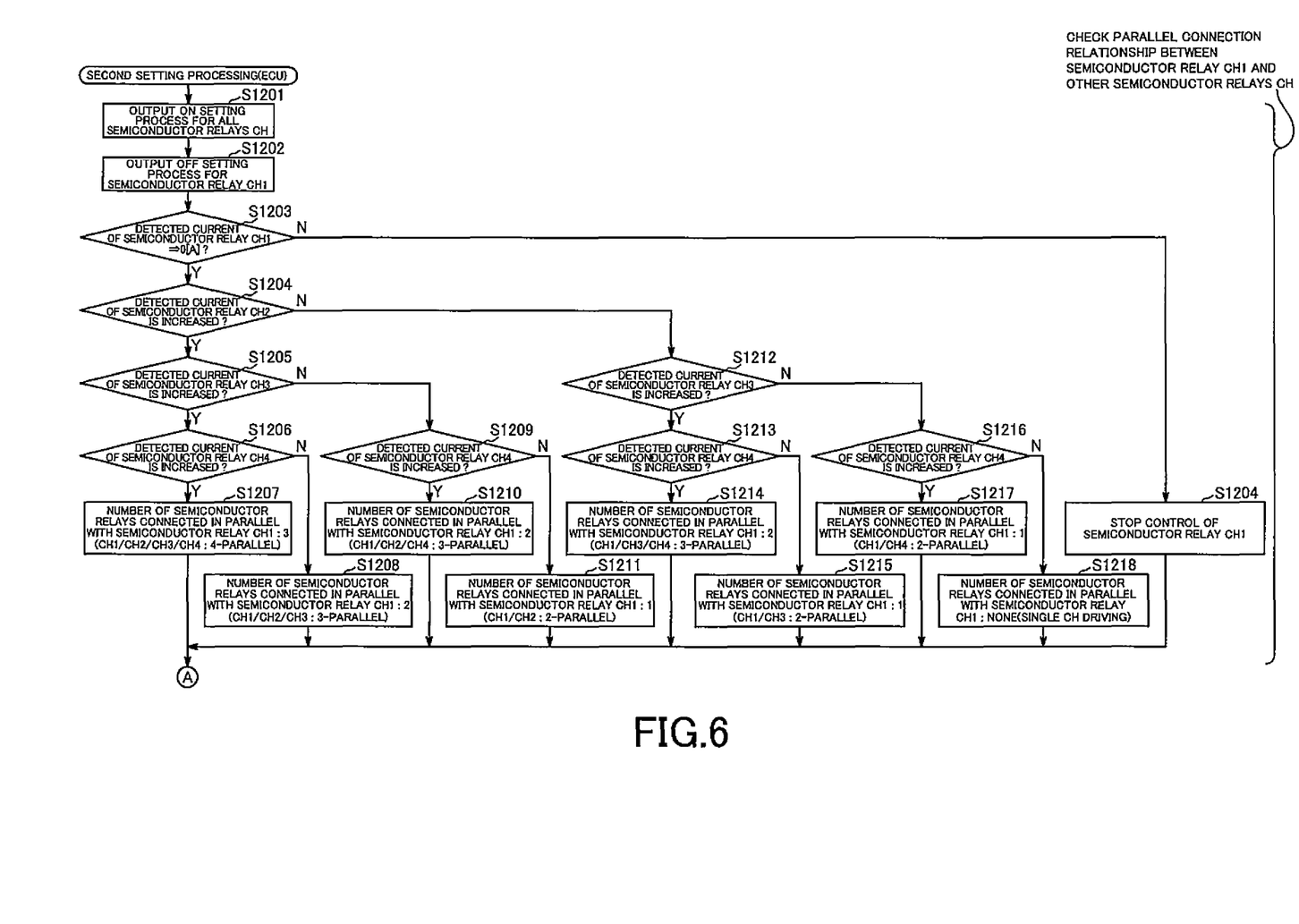
FIG. 6 is a flowchart showing second setting processing by the ECU shown in FIG. 1.

The second setting processing is processing for setting an ID according to the number of parallel connections of loads 20 connected to the ECU 3. The number of parallel connections is the number of groups of the semiconductor relays CH1-CH4 which are connected in parallel with one another. That is, the semiconductor relays CH1-CH4 in the same group are connected in parallel with one another, but the semiconductor relays CH1-CH4 in different groups are not connected in parallel with one another.

In the second setting processing, a detected current from each semiconductor relay CH1-CH4 when all the semiconductor relays CH1-CH4 are on is captured. For example, the detected current is assumed to be 10A for the semiconductor relay CH1, 10A for the semiconductor relay CH2, 10A for the semiconductor relay CH3, and 5A for the semiconductor relay CH4.

Next, the semiconductor relay CH1, which is one of all the semiconductor relays CH1-CH4, is switched off, and the detected current is captured at this time from each semiconductor relay CH1-CH4. At this time, the detected current is assumed to be 0A for the semiconductor relay CH1, 15A for the semiconductor relay CH2, 15A for the semiconductor relay CH3, and 5A for the semiconductor relay CH4. It can

TABLE 6

| Dedicated ID | | | | | | | | Completion Signal | | | | | | | |
|---|---|---|---|---|---|---|---|---|---|---|---|---|---|---|---|
| bit7 | bit6 | bit5 | bit4 | bit3 | bit2 | bit1 | bit0 | bit7 | bit6 | bit5 | bit4 | bit3 | bit2 | bit1 | bit0 |
| 0 | 1 | 0 | 0 | 1 | 1 | ECU No. No1: 00 No2: 01 No3: 10 No4: 11 | | ID Setting Completion Complete: 1 Initial: 0 | — | — | — | — | — | — | — |

If the completion signal is not received within a predetermined period of time T5 from transmission of the network thus be seen that semiconductor relays CH2, CH3, where the detected currents were increased when the semiconductor relay CH1 was switched from on to off, are connected in parallel with the semiconductor relay CH1. On the other hand, it can be seen that the semiconductor relay CH4, where the detected current is unchanged, is not connected in parallel with the semiconductor relay CH1. When the above is repeated for the semiconductor relays CH2-CH4, the connection relationship among the semiconductor relays C1-C4 can be grasped.

Figure 7:
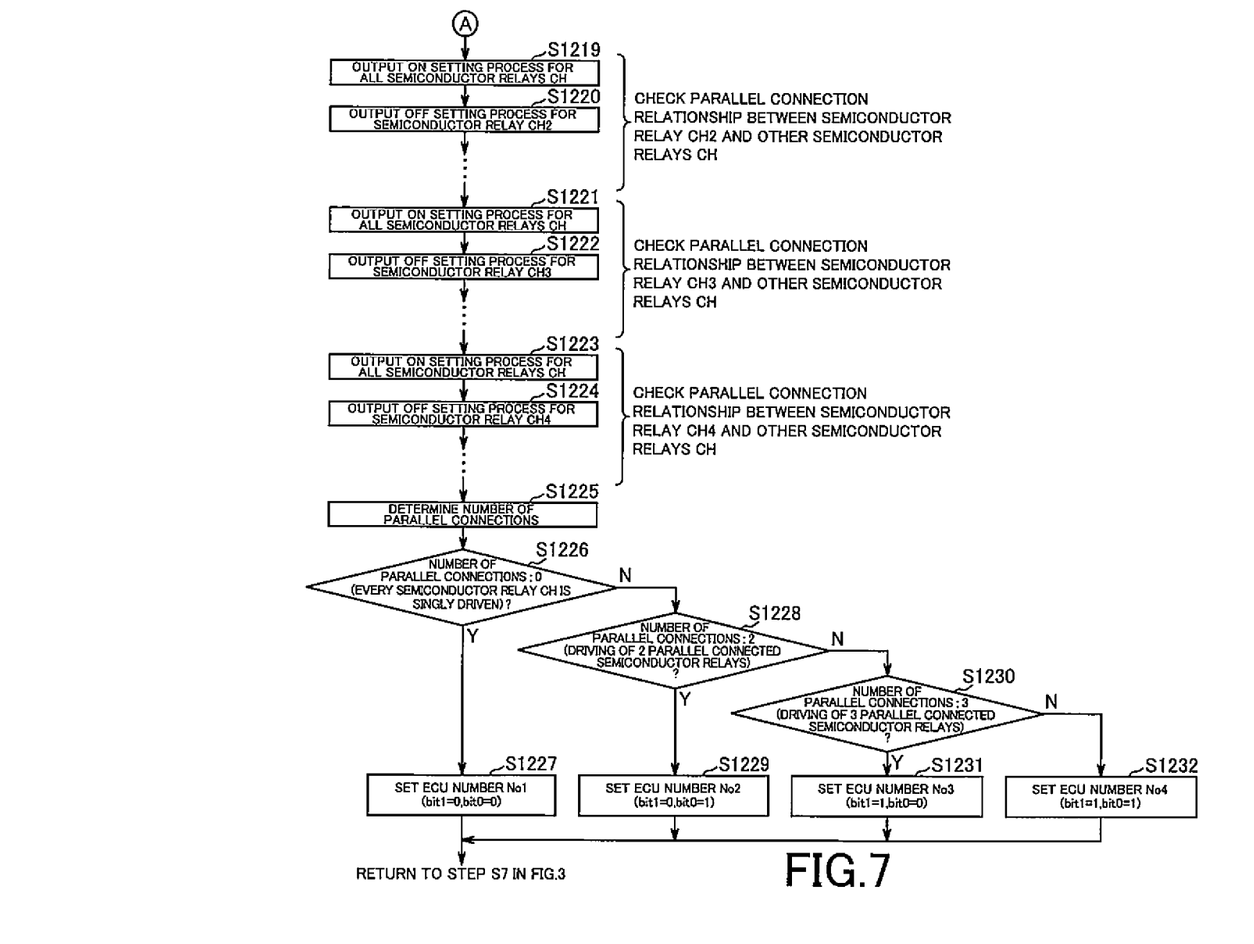
FIG. 7 is a flowchart showing following processes of the second setting processing shown in FIG. 6.

Next, a specific operation of the ECU 3 in the second setting processing will be described with reference to the flowcharts in FIGS. 6 and 7. The ECU 3 switches on all the semiconductor relays CH1-CH4, and captures detected currents from all the semiconductor relays CH1-CH4 (step S1201). Next, the ECU 3 switches off the semiconductor relay CH1, and captures the detected currents from all the semiconductor relays CH1-CH4 (step S1202).

Next, if the detected current of the semiconductor relay CH1 is not zero (step S1203: N), the ECU 3 stops control of the semiconductor relay CH1, assuming that the semiconductor relay CH1 cannot be controlled in a normal manner (step S1204), and proceeds to step S1219 shown in FIG. 7. If the detected current of the semiconductor relay CH1 is zero (step S1203: Y), and if the detected currents of the semiconductor relays CH2-CH4 are increased (steps S1204-S1206: Y), the ECU 3 determines that the semiconductor relays CH2-CH4 are connected in parallel with the semiconductor relay CH1 (step S1207).

Furthermore, if the detected currents of the semiconductor relays CH2, CH3 are increased but the detected current of the semiconductor relay CH4 remains unchanged (steps S1204 and S1205: Y, and step S1206: N), the ECU 3 determines that the semiconductor relays CH2, CH3 are connected in parallel with the semiconductor relay CH1, and that the semiconductor relay CH4 is not connected in parallel with the semiconductor relay CH1 (step S1207).

Furthermore, if the detected currents of the semiconductor relays CH2, CH4 are increased but the detected current of the semiconductor relay CH3 remains unchanged (step S1204: Y, step S1205: N, step S1209: Y), the ECU 3 determines that the semiconductor relays CH2, CH4 are connected in parallel with the semiconductor relay CH1, and that the semiconductor relay CH3 is not connected in parallel with the semiconductor relay CH1 (step S1210).

Furthermore, if the detected current of the semiconductor relay CH2 is increased but the detected currents of the semiconductor relays CH3, CH4 remain unchanged (step S1204: Y, step S1205: N, step S1209: N), the ECU 3 determines that the semiconductor relay CH2 is connected in parallel with the semiconductor relay CH1, and that the semiconductor relays CH3, CH4 are not connected in parallel with the semiconductor relay CH1 (step S1211).

Furthermore, if the detected currents of the semiconductor relays CH3, CH4 are increased but the detected current of the semiconductor relay CH2 remains unchanged (step S1204: N, step S1212: Y, step S1213: Y), the ECU 3 determines that the semiconductor relays CH3, CH4 are connected in parallel with the semiconductor relay CH1, and that the semiconductor relay CH2 is not connected in parallel with the semiconductor relay CH1 (step S1214).

Furthermore, if the detected current of the semiconductor relay CH3 is increased but the detected currents of the semiconductor relays CH2, CH4 remain unchanged (step S1204: N, step S1212: Y, step S1213: N), the ECU 3 determines that the semiconductor relay CH3 is connected in parallel with the semiconductor relay CH1, and that the semiconductor relays CH2, CH4 are not connected in parallel with the semiconductor relay CH1 (step S1215).

Furthermore, if the detected current of the semiconductor relay CH4 is increased but the detected currents of the semiconductor relays CH2, CH3 remain unchanged (step S1204: N, step S1212: N, step S1216: Y), the ECU 3 determines that the semiconductor relay CH4 is connected in parallel with the semiconductor relay CH1, and that the semiconductor relays CH2, CH3 are not connected in parallel with the semiconductor relay CH1 (step S1217).

Furthermore, if the detected current of each semiconductor relay CH2-CH4 remains unchanged without being increased (step S1204: N, step S1212: N, step S1216: N), the ECU 3 determines that there is no semiconductor relay which is connected in parallel with the semiconductor relay CH1 (step S1218).

In a similar manner, which semiconductor relay is connected in parallel is determined for the semiconductor relays CH2-CH4 (steps S1219-S1224). Then, the ECU 3 determines the number of parallel connections based on the determination result (step S1225).

If, according to the determination result, the number of parallel connections is one (step S1226: Y), the ECU 3 sets the ECU number to No1 (bit1=0, bit2=0) (step S1227), and returns to step S7 in FIG. 3. Furthermore, if the number of parallel connections is two (step S1228: Y), the ECU number is set to No2 (bit1=0, bit2=1) (step S1229), and step S7 in FIG. 3 is performed. Furthermore, if the number of parallel connections is three (step S1230: Y), the ECU number is set to No3 (bit1=1, bit2=0) (step S1231), and step S7 in FIG. 3 is performed. If the number of parallel connections is four (step S1230: N), the ECU number is set to No4 (bit1=1, bit2=1) (step S1232), and step S7 in FIG. 3 is performed.

As shown in FIG. 3, if there is an overlapping ECU number even when the ID is determined based on the number of parallel connections described above (step S25: N, and step S28: Y), the gateway 2 acts as a third setting unit, and broadcasts a third request signal requesting for setting of an ID according to a sum of drive currents of loads 20 (third information) connected to the ECU 3 (step S31). If the third request signal is received within a predetermined period of time T4 from transmission of the ECU number (step S13: Y), the ECU 3 performs third setting processing for setting an ID according to the sum of drive currents of loads 20 connected to the ECU 3 (step S14).

Next, the third setting processing mentioned above will be described with reference to FIG. 8. In the third setting processing, the ECU 3 switches on all the semiconductor relays CH1-CH4, and captures detected currents from all the semiconductor relays CH1-CH4 (step S141). The detected current is a drive current that flows through the load 20 connected to each semiconductor relay CH1-CH4. Then, if the sum of the detected currents is equal to or lower than a first determination current (step S142: Y), the ECU 3 sets the ECU number to No1 (bit1=0, bit2=0) (step S143), and returns to step S7 in FIG. 3.

Figure 8:
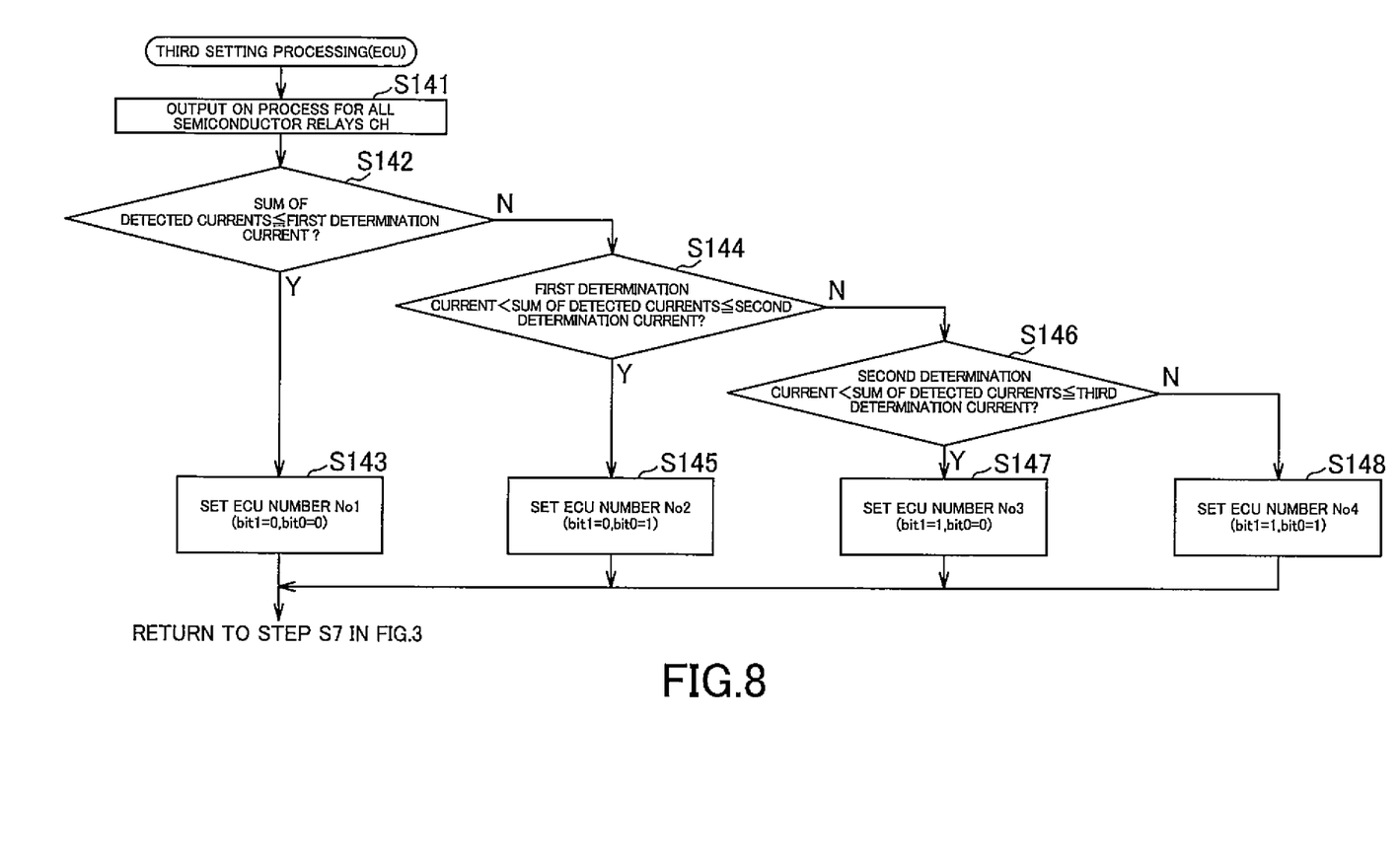
FIG. 8 is a flowchart showing third setting processing by the ECU shown in FIG. 1.

Furthermore, if the sum of the detected currents is higher than the first determination current and equal to or lower than a second determination current (step S142: N, and step S144: Y), the ECU 3 sets the ECU number to No2 (bit1=0, bit2=1) (step S145), and proceeds to step S7 in FIG. 3. Furthermore, if the sum of the detected currents is higher than the second determination current and equal to or lower than a third determination current (step S146: Y), the ECU 3 sets the ECU number to No3 (bit1=1, bit2=0) (step S147), and proceeds to step S7 in FIG. 3. Moreover, if the sum of the detected currents is higher than the third determination current (step S146: N), the ECU 3 sets the ECU number to No4 (bit1=1, bit2=1) (step S148), and proceeds to step S7 in FIG. 3.

According to the embodiment described above, the gateway 2 causes each ECU to set an ID according to the number of loads 20 connected to the ECU 3. Moreover, in the case where the IDs of a plurality of ECUs 3 set according to the number of loads 20 are overlapped, the gateway 2 causes the ECUs 3 to set an ID according to the number of parallel connections of loads 20, instead of the number of loads 20. The IDs of the ECUs 3 may thus be prevented from being overlapped with each other. Moreover, ID setting of the ECU 3 may be easily performed.

Moreover, according to the embodiment described above, in the case where the IDs of a plurality of ECUs 3 set based on the number of parallel connections are overlapped, the gateway 2 causes the ECUs 3 to set an ID according to the sum of drive currents that flow through the loads 20 connected to the ECU 3, instead of the number of loads 20 and the number of parallel connections. Overlapping of IDs of the ECUs 3 is thus further prevented. That is, according to the present embodiment, IDs can be set in the ECUs 3 connected to the gateway 2 if there is no overlap with respect to at least one of the number of connected loads 20, the number of parallel connections, and the sum of drive currents.

Moreover, according to the embodiment described above, IDs of the ECUs 3 connected to a plurality of gateways 2 disposed in respective areas may be set at the same time, and thus, ID setting time may be reduced.

Moreover, according to the embodiment described above, the ECU 3 sets an ID by determining the number of loads 20, the number of parallel connections, or the sum of drive currents based on the detected currents of the semiconductor relays CH1-CH4. Accordingly, continuity check may also be performed at the time of ID setting.

Moreover, according to the embodiment described above, in the ID setting processing, the status of a load 20 connected to the ECU 3 may be grasped by determining the number of loads 20, the number of parallel connections, or the sum of drive currents. Accordingly, when a new ECU 3 is connected to the in-vehicle network 1, a load control program suitable for load control may be selected and written.

Additionally, according to the embodiment described above, the number of loads 20 is used as the first information, but this is not restrictive. The first information may be any one of the number of loads 20, the number of parallel connections, and the sum of drive currents, and it may be the number of parallel connections or the sum of drive currents. Furthermore, the second information may be any one of the number of loads 20, the number of parallel connections, and the sum of drive currents which is not used as the first information, as long as the second information is different from the first information. Moreover, the third information may be any one of the number of loads 20, the number of parallel connections, and the sum of drive currents which are not used as the first information and the second information, as long as the third information is different from the first information and the second information.

Furthermore, according to the embodiment described above, one of the number of loads 20, the number of parallel connections, and the sum of drive currents is used as the first information, but this is not restrictive. The first information may be information other than those mentioned above, and for example, the first information may be a lock current of a motor, as in a conventional case.

Moreover, according to the embodiment described above, in the case where IDs according to the first information and the second information are overlapped, the gateway 2 causes an ID according to the third information to be set, but this is not restrictive. In the case where IDs according to the first information and the second information are overlapped, the gateway 2 may immediately stop the processing, assuming that IDs cannot be set, without performing ID setting according to the third information.

Additionally, the present invention is not limited to the embodiment described above. That is, various modifications may be made within the gist of the present invention.

REFERENCE SIGNS LIST 2 gateway (setting device)
3 ECU (computer)
20 load
21A CPU (first setting unit, second setting unit, third setting unit)
32A CPU (fourth setting unit, fifth setting unit, transmission unit)

What is claimed is:

1. An in-vehicle gateway of an in-vehicle network including a communication line and a plurality of computers electrically connected to the in-vehicle gateway via the communication line, the in-vehicle gateway configured to cause the plurality of computers connected to a load to set identification information, the in-vehicle gateway comprising:
an interface in electrical communication with the communication line of the in-vehicle network and each of the computers; and
a controller electrically connected to the interface and performs processing in,
a first setting mode such that the controller causes each of the computers to set identification information according to first information related to the load; and
a second setting mode such that the controller causes the plurality of computers to set identification information according to second information about the load different from the first information, in a case where pieces of identification information of the plurality of computers set by the first setting mode are overlapped,
wherein each of the first information and the second information is one of the number of loads connected to the computer, the number of parallel connections of loads connected to the computer, and a sum of drive currents flowing through loads connected to the computer.

2. The in-vehicle gateway according to claim 1, wherein the controller preforms processing as a third setting mode such that the controller causes the computers to set identification information according to third information about the load different from the first information and the second information, in a case where pieces of identification information of the plurality of computers set by the second setting mode are overlapped.

3. The in-vehicle gateway according to claim 2, wherein each of the first information and the second information is one of the number of loads connected to the computer, the number of parallel connections of loads connected to the computer, and a sum of drive currents flowing through loads connected to the computer.

4. The in-vehicle gateway according to claim 2, wherein the third information is one of the number of loads connected to the computer, the number of parallel connections of loads connected to the computer, and a sum of drive currents flowing through loads connected to the computer.

5. A first computer of an in-vehicle network including a communication line and an in-vehicle gateway, the first computer being one of a plurality of computers connected to the in-vehicle network, the first computer comprising:
   an interface configured to be in electrical communication with the in-vehicle gateway, the communication line, and each of the computers; and
   a controller electrically connected to the interface and configured to set identification information of the first computer in response to a request sent by the in-vehicle gateway, and the controller performs processing in,
      a fourth setting mode such that the controller detects first information about a load connected to the computer, in response to a setting request from the setting device for identification information according to the first information, and sets the identification information of the computer,
      a fifth setting mode such that the controller detects second information about the load different from the first information, in response to a setting request from the setting device for identification information according to the second information, and sets the identification information of the computer, and
      a transmission mode such that the controller transmits, to the setting device, the identification information of the computer set by the fourth setting device and the fifth setting mode,
   wherein each of the first information and the second information is one of the number of loads connected to the first computer, the number of parallel connections of loads connected to the first computer, and a sum of drive currents flowing through loads connected to the first computer.

* * * * *